United States Patent [19]

Gibson

[11] 4,254,964
[45] Mar. 10, 1981

[54] COLLAPSABLE SNOW SLED

[76] Inventor: Larry N. Gibson, Rte. 6, Box 424B, Crossville, Tenn. 38555

[21] Appl. No.: 33,850

[22] Filed: Apr. 26, 1979

[51] Int. Cl.³ .............................................. B62B 13/16
[52] U.S. Cl. .................................. 280/20; 280/21 R; 280/28
[58] Field of Search ................. 280/20, 16, 17, 15, 280/21 R, 28

[56] References Cited

U.S. PATENT DOCUMENTS

| 549,974 | 11/1895 | Mill | 280/21 R |
|---|---|---|---|
| 791,683 | 6/1905 | Fee | 280/16 |
| 1,667,436 | 4/1928 | Rainey | 280/16 |
| 2,673,744 | 3/1954 | Johnson | 280/20 |
| 3,180,652 | 4/1965 | Johansson | 280/20 |
| 3,504,924 | 4/1970 | Nesbit | 280/20 |

FOREIGN PATENT DOCUMENTS

| 2491155 | 7/1912 | Fed. Rep. of Germany | 280/21 R |
|---|---|---|---|
| 90227 | 11/1967 | France | 280/16 |
| 650093 | 12/1962 | Italy | 280/20 |
| 50638 | 11/1909 | Switzerland | 280/16 |
| 67334 | 12/1913 | Switzerland | 280/16 |

Primary Examiner—David M. Mitchell
Attorney, Agent, or Firm—Pitts & Kesterson

[57] ABSTRACT

A simple and inexpensive to manufacture two piece sled which can be folded for storage and which has a single front steerable runner is disclosed. According to this invention, readily available steel tubing is bent and welded to form a back unit having two runners secured by support members. A deck for sitting or carrying a load is secured to the support members. In a similar manner, steel tubing is also bent and welded to form a single runner front unit which also has a deck. The single runner can be steered by handles also formed of the steel tubing. The front unit and the back unit are then joined at two pivotpoints such that the two units will fold together into a compact unit for storage.

7 Claims, 10 Drawing Figures

COLLAPSABLE SNOW SLED

BACKGROUND OF THE INVENTION

This invention relates generally to snow sleds which are simple and inexpensive to manufacture. More particularly this invention relates to a collapsible or folding snow sled made substantially of steel tubing and which has a single steerable front runner. The sled is light weight, very strong and may be used as either a sporting sled for carrying one or more persons in the sport of downhill sledding, or the sled may be used as a folding sled suitable for hunting, carrying equipment and the like.

An investigation of the available references relating to the field of sleds revealed no prior art that is significantly relevant to this invention. One reference, U.S. Pat. No. 3,504,924 issued to D. J. Nesbit on Apr. 7, 1970, discloses a telescoping collapsible sled having a pair of rear parallel skis as runners, a frame mounted on the rear skis, a front pivotted ski for steering, and a front frame telescopicably secured to the rear frame. A folding bed is adapted so that several load positions may be selected. The sled described in the Nesbit patent is not a simple and inexpensively manufactured item. Use of skis as runners, and the use of a telescoping frame for collapsing results in a complicated device. The sled of the present invention results in a device much simpler and easier and less expensive to manufacture.

U.S. Pat. No. 3,365,209 issued to B. Fischer on Jan. 23, 1968, discloses a collapsible sled having two substantially endless and longitudinally extending frame members which are connected to each other at their ends by pivot joints, a fabric or pliable seat member connects to adjacent frame members to provide a support member when the sled is in the unfolded position. Although this sled may be very simple and lightweight, it would be substantially suitable only for emergency use, as it has no steering ability.

Another portable sled is described in U.S. Pat. No. 2,673,744 issued to V. G. Johnson on Mar. 30, 1954. The sled described in this patent, has as a primary purpose use as a survival sled or as a hunting sled used for bringing game out of the hunting area to a road for vehicular transportation. The sled comprises two pieces which are pivotted and which folds upon itself. Crossmembers serve both as support bars for carrying a load and as a structure to maintain the runners in the proper location. Apertures in the crossmembers may be used for tying down the game or the load. Although this sled may be highly successful for use as a hunting or survival sled, it is not steerable, and is not useful as a sporting or downhill sledding device. Furthermore, the front and back sections of this foldable sled have two runners unlike the sled of the present invention which has a single runner for the front portion of the sled.

Still another example of a downhill sporting sled is disclosed in U.S. Pat. No. 1,450,424 issued to C. S. Beebe on Apr. 3, 1923. This sled has the appearance of a typical childs toy or sporting sled with two main runners except it also includes a short center pivotting runner at the front of the sled which is used for steering.

Other examples of sleds which had been studied, but found to be even less applicable than the sleds discussed above are disclosed in U.S. Pat. No. 3,180,652 issued on Apr. 27, 1965 to E. A. I. Johansson; U.S. Pat. No. 1,212,212 issued to D. Y. Hallock on Jan. 16, 1917, and U.S. Pat. No. 1,066,445 issued to O. L. Beardsley on Jul. 1, 1913.

SUMMARY OF THE INVENTION

Accordingly, it is an object of this invention to provide a sled which is simple and inexpensive to manufacture.

It is another object of this invention to provide a collapsible or folding sled which may be readily stored.

It is still another object of this invention to provide a strong and lightweight sled which may be used for sporting hunting and work purposes.

These and other objects which will become evident in the following drawings and detailed descriptions, are accomplished by the present invention by the use of lightweight tubing such as steel or the like which is formed and welded to form a rear or back unit. The back unit comprises two runners, a support structure and a deck for sitting or carrying a burden. The tubing is formed to serve as both the runners and the support structure. A front unit also formed of welded tubing includes a steerable runner made of the tubing to which is fixedly attached a handle. A support structure, with a deck for the front unit is pivotally attached to the runner and handle. The front support structure is hingedly joined to the support structure of the rear unit such that the front unit and rear units may fold together into a compact unit for storage.

Accordingly, the above mentioned objects and subsequent description will be more readily understood by reference to the following drawings wherein:

DESCRIPTION OF THE INVENTION

Figure 1:
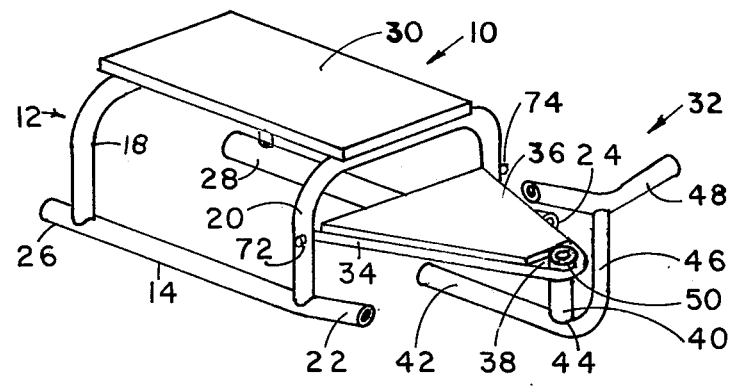
FIG. 1 is a perspective view of one embodiment of a snow sled having the features of this invention.
Figure 2:
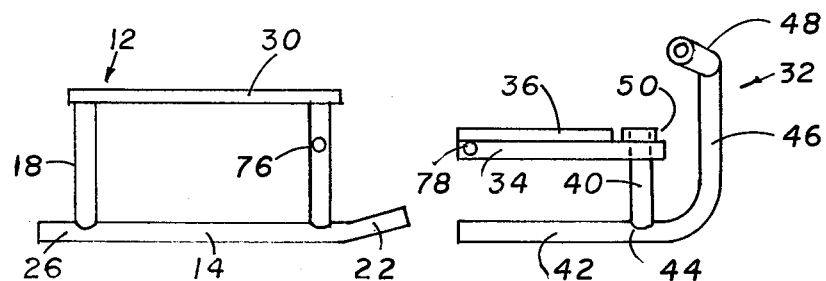
FIG. 2 is a side view of the sled of FIG. 1 wherein the rear and front units are separated.
Figure 3:
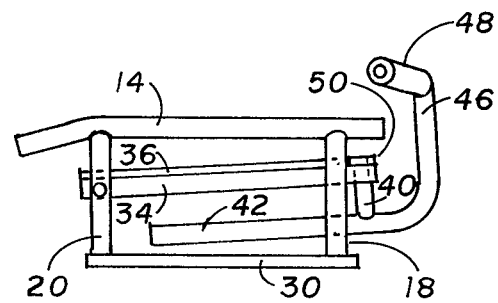
FIG. 3 is a side view of the sled of FIG. 1 wherein the front and rear units are folded together for storage.

Referring now to FIG. 1 there is shown generally at 10 a perspective view of an embodiment incorporating the features of the snow sled of the present invention. As shown, a back or rear unit designated generally as 12 includes two runners 14 and 16 which are joined fixedly in position by two support members 18 and 20. As can be seen in FIG. 1, and more clearly in FIG. 2, runners 14 and 16 include a front portion 22 and 24, which front portions are sloped upward by bending so that the ends of these members will not dig into the snow as it moves. Cross members 18 and 20 are attached at ends 22 and 26 of runner 14 and ends 24 and 28 of runner 16 respectively by any suitable means. However, for ease of manufacturing simplicity, it is suggested that members 18 and 20 be attached to runners 14 and 16 by welding. As can be seen, the runners 14 and 16 as well as the support members 18 and 20 are formed of suitable lightweight tubing. Although any sort of commercially available tubing such as steel, aluminum, fiberglass, PVC or the like may be used to form runners 14 and 16 as well as crossmembers 18 and 20, it will be appreciated that steel tubing such as is commonly used on the exhaust system of an automobile is particularly inexpensive and suitable for use with this invention. Such steel tubing, may be readily formed and welded to obtain the rear structure shown generally at 12. A deck 30 is attached to crossmembers 18 and 20 by any suitable means such as nuts and bolts, brackets or the like. It will be appreciated, that deck 30 may also be made of any suitable material such as wood or sheet metal. It will further be appreciated that deck 30 provides further strength and support to the unit 12 as well as providing a place for sitting or carrying a burden or load if the sled is used for such purposes.

Figure 4:
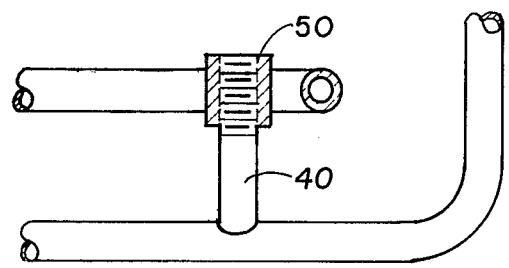
FIG. 4 is a cutaway and partial cross-sectional view of the pivotting mechanism of one embodiment of the steerable single runner of the sled of FIG. 1.
Figure 5:
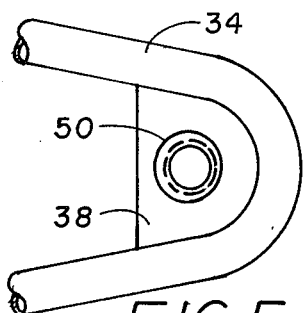
FIG. 5 shows a top view of the steering mechanism of FIG. 4.
Figure 6:
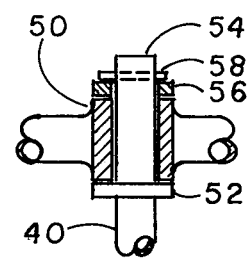
FIG. 6 shows a partial cross-sectional view of an alternate embodiment of the pivoting mechanism used on the embodiment of FIGS. 1 through 3.
Figure 8:
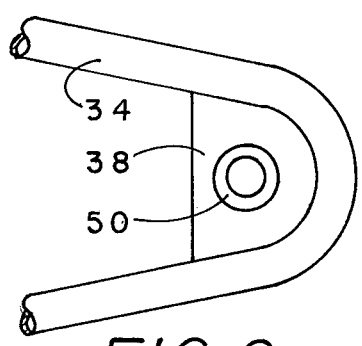
FIGS. 8 and 9 show a top and exploded view respectively of the alternate steering mechanism of the FIG. 7.

A front unit designated generally as 32 includes a substantially triangular shaped support frame 34, a front deck 36 and a pivot support structure 38 at the apex of the triangular support frame 34. Pivotally attached at pivot structure 38 is a substantially vertical support member 40 which leads to a combination front runner and handle unit 42. Vertical support number 40 may be attached to combination unit 42 by any suitable means, however, it is particularly useful to weld support member 40 to combination 42 such as is shown at weld 44. Combination runner and handle unit 42 terminates at end 46 with a handle bar unit 48 also formed of steel tubing. Handle bar unit 48 is similarly attached to combination unit 42 by any suitable manner such as for example by welding. It is seen that front unit 32 is also substantially fabricated from suitable tubing such as was discussed with respect to rear unit 12. Again, suitable tubing includes steel tubing commercially used in the exhaust systems of automobiles. It should be understood, that support member 40 pivots in a bearing structure 50 attached to support structure 38. The bearing structure 50 may be any suitable bearing or sleeve arrangement which will allow support member 40 to rotate therein. A very simple and inexpensive technique as shown in FIGS. 4 and 5 is to provide internal threads in bearing structure 50 and external threads on support member 40, and simply screw the two units together. Such a technique also allows for even further collapsing if desired for storage. Still another technique as shown in FIGS. 6 and 8 is to weld a ring 52 to support member 40 and then provide bearing structure 50 with an aperture large enough such that the upper end 54 of support member 40 will slide through bearing structure 50, which as is shown in FIG. 6, is not threaded, and extend above support member 50. A second washer 56 may be attached to end 54 in any suitable manner such as for example, by a pin 58 thereby locking support member 40 securely within bearing structure 50 in such a matter that member 40 may rotate therein.

It should be noted, that in the illustrated embodiments of FIGS. 1 through 4 and 7, the distance between runner 42 and deck 36 of front unit 52 is only about one half the distance between runner 14 and 16 and deck 30 of rear unit 12. This staggered deck arrangement will be discussed hereinafter with respect to the details of folding the front unit 32 and back unit 12 together in a compact unit for storage.

Figure 7:
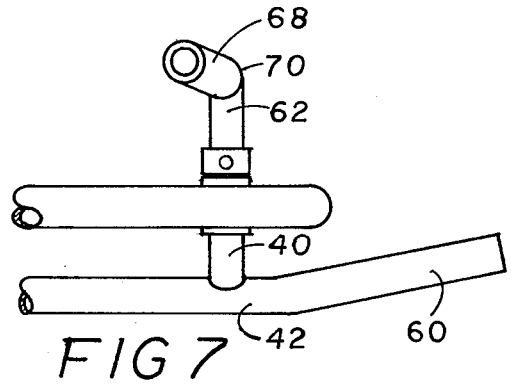
FIG. 7 shows an alternate embodiment of the steering mechanism and handle of the steerable front runner of a sled incorporating the features of this invention.
Figure 9:
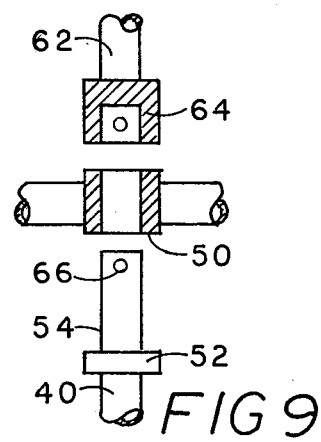

Referring now to FIGS. 7, 8 and 9, there is shown an alternate embodiment for attaching the steerable runner to the front unit 32. According to this embodiment, single steerable front runner 42 is not formed in a manner suitable for attaching handle bars 48. According to this embodiment, front runner 42 simply includes a slightly raised portion 60 which prevents the runner from digging into the snow in the same manner as raised portion 22 and 24 of the two rear runners of back unit 12. Further, according to this particular embodiment, rather than simply attaching a top washer 56 to the end 54 of support member 40, an extension member 62 is attached to end 54 of member 40. This extension member further includes a collar 64 which will prevent support member 40 from coming loose from bearing structure 50. As shown in the emodiment of FIGS. 7, 8 and 9, extension member 62 is attached to support member 40 by means of a pin and hole arrangement as shown at 66. Handle bars 68 are then welded or otherwise attached to end 70 of extension member 62.

Figure 10:
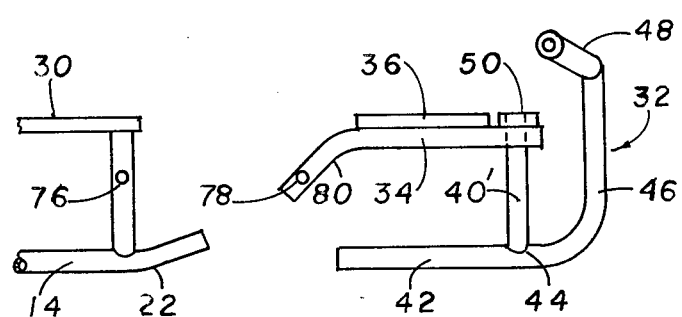
FIG. 10 shows a partial side view of an alternate embodiment of the present invention wherein the front and rear decks are substantially at the same level.

The back unit 12 and the front unit 32 are then pivotally hinged together by pins 72 and 74. As can be clearly seen in FIG. 2, pin 72 extends through aperture 76 and 78 on one side of the sled and pin 74 extends through similar aperture (not shown) on the other side. Thus, as is clearly illustrated in FIG. 3, front unit 32 will fold back and lie between runners 14 and 16 of rear unit 12 to provide a compact unit for storage. It can be seen from the Figures that in order for front unit 32 and rear unit 12 to fold together in the most compact form, the pivot point or aperture 76 and its companion or support member 20 should be substantially midway between deck 30 and the bottom of runner 14. Thus, in FIGS. 1 through 4 and 7 this is accomplished by making the distance between deck 36 and the bottom of runner 42 only about one-half the distance between deck 30 and the bottom of runner 14. However, as shown in the alternate embodiment of FIG. 10, compact storage can also be achieved while maintaining front deck 32 at the same level as rear deck 12 by including an extension 80 to support member 34 which bends down such that aperture 76 and 78 can be joined.

Thus although, the present invention has been described with respect to specific embodiment of collapsible and inexpensively manufactured snow sleds, it is not intended that such specific references be considered limitation upon the scope of this invention except insofar set forth in the following claims.

What is claimed is:

1. A collapsible snow sled comprising:
   a rear unit having two parallel runners formed of tubing having a circular cross-section and maintained in position by a front and rear support member attached therebetween, said rear unit further including a deck member securely attached to said support members;
   a front unit including a support structure, a front deck, and steerable runner having a circular cross-section, said front deck being securely attached to said front support structure, and said steerable front runner being pivotally attached to said front support structure;
   means for pivotally securing said front unit to the front support member of said rear unit at a point substantially one half of the distance between said parallel runners, and said deck such that said front unit may be folded back and between the parallel runners of said rear unit in a compact unit for storage.

2. The sled of claim 1 and further comprising means for steering attached to said steerable runner.

3. The sled of claim 2 wherein said means for steering comprises an extension of the front of said steerable runner, which extension is bent upwardly and away from that portion of the runner which contacts the snow, and handle bars attached to the end of said extension.

4. The sled of claims 1, 2 or 3, wherein said front unit further includes a tube portion attached to said front runner and a bearing structure secured to said front support member such that said tube portion extends through and rotates within said bearing structure for pivotally attaching said steerable front runner to said front support structure.

5. The sled of claim 4 further comprising an extension of said tube portion and handle bars attached to the end of said extension for steering.

6. The sled of claim 1 wherein the distance between said front runner and said front deck is substantially one half of the distance between said rear runners and said rear deck, and said support of said front unit is pivotally secured to said rear unit.

7. The sled of claim 1 wherein the distance between said front runner and said front deck is substantially the same as the distance between said back runner and said back deck, and further including a rearward extension to said support structure which curves down to a point substantially one half of the distance between said parallel runner and said deck of said rear unit, and wherein said extension of said support structure is pivotally secured to said rear unit.

* * * * *